United States Patent [19]
Bjermo et al.

[11] 4,114,753
[45] Sep. 19, 1978

[54] SLUDGE FILM CONVEYING DEVICE

[75] Inventors: Göte Herbert Egard Bjermo; Paul Einar Tresjö, both of Västerås, Sweden

[73] Assignee: System AB Infotenik, Västerås, Sweden

[21] Appl. No.: 821,726

[22] Filed: Aug. 4, 1977

Related U.S. Application Data

[60] Continuation-in-part of Ser. No. 651,250, Jan. 22, 1976, abandoned, which is a division of Ser. No. 519,559, Oct. 31, 1974, Pat. No. 3,960,725.

[30] Foreign Application Priority Data

Nov. 5, 1973 [SE] Sweden ................................ 731496

[51] Int. Cl.² .......................... B65G 37/00; B01D 1/22
[52] U.S. Cl. ........................................ 198/608; 159/10
[58] Field of Search .......................... 159/10, 11 R, 49; 34/117, 119, 121; 118/262; 210/71, 73 R, 152; 198/608

[56] References Cited

U.S. PATENT DOCUMENTS

| 2,320,523 | 6/1943 | Jirousek | 118/262 X |
| 2,589,966 | 3/1952 | Rullo | 118/262 X |
| 2,724,363 | 11/1955 | Fowler et al. | 118/262 X |
| 2,858,796 | 11/1958 | Stuchberg | 118/262 |
| 3,405,006 | 10/1978 | Follrath | 118/262 X |
| 3,875,581 | 4/1975 | Yamashita et al. | 118/262 X |

*Primary Examiner*—Morris Kaplan
*Attorney, Agent, or Firm*—Hane, Roberts, Spiecens & Cohen

[57] ABSTRACT

A pair of rollers define between them a narrow gap which is supplied with sludge to be treated. The sludge is conveyed by one of the pair of rollers to a third roller in contact with the conveying roller. The third roller is spaced a short distance from a rotating drum carrier to which is applied a thin film of the sludge. The sludge is applied to the carrier by the formation of a sludge bulge, which is an accumulation of sludge, in the area defined by the carrier, the third roller, and the conveying roller. The drum carrier picks up the sludge from the sludge bulge forming a film of sludge whose thickness is limited by the spacing of the third roller from the carrier.

8 Claims, 4 Drawing Figures

SLUDGE FILM CONVEYING DEVICE

The present application is a continuation-in-part application of pending application Ser. No. 651,250 now abandoned, filed Jan. 22, 1976 which, in turn, is a divisional application based on application Ser. No. 519,559, filed Oct. 31, 1974 and issued as U.S. Pat. No. 3,960,725 issued June 1, 1976.

BACKGROUND OF THE INVENTION

The present invention relates to a device used in an automatic and continuous method of converting heavy metal hydroxides, which are an environmental hazard and are poisonous, and which are obtained in sludge from purification works for pickling, rinsing and surface-treatment plants, into heavy metal oxides in powder and/or granulated form.

There are many industrial processes for which fresh water is required, where the water, after having been used, contains various pollutants that are carried along with the waste water into the ocean, lakes, rivers and streams, unless they pass first through municipal purification workds. In special cases of pollution, it is inappropriate to allow the waste water to be fed into municipal purification works. This applies particularly when the industrial waste contains heavy metals such as lead, copper, chromium, nickel, cadmium, zinc, etc.

The metals most often occur together with acids, and then form very poisonous compounds. The compounds occur in pickling and surface-treatment processes which require for the subsequent rinsing processes much fresh water and result in highly polluted waste water.

If suitable acid and metal recovery devices are not available, the used bath water is discharged into the sewer system together with the wash water.

Industries are now required, to an increasing degree, to arrange for waste water treatment before the waste water is discharged into the municipal purification works or out into rivers and streams or other open waters.

This treatment usually consists of neutralizing the acids with the aid of basic additives and with the aid of special additives (flocculation agents) to precipitate the dissolved metals in hydroxide flocks, which are either allowed to sediment in decantering vessels or are skimmed off in floatation plants, whereupon the treated water is harmless for discharge into the municipal purification works or into open water.

The hydroxide sludge, which contains 96-98% water, is still poisonous and constitutes an environmental hazard, and as simple methods of destroying the sludge are not available in the matket at present, the companies have great difficulty in disposing of it. Central collection places have been arranged, to which the sludge is conveyed with tank trucks. There are, of course, risks involved in transporting considerable quantities of poison on public roads. Moreover, it is unsatisfactory that large quantities of poison are concentrated in certain places, as the risk for unintentional discharging through leakage increases as the stocks grow continuously since there is no suitable destruction equipment available.

From an environmental point of view it would be most appropriate to neutralize dangerous poisons and waste at the source, so that the residual products will be entirely harmless and, if possible, can either be subjected to recovery processes or else can be deposited among ordinary municipal waste.

In U.S. Pat. No. 3,960,725, there is set forth a method of achieving suitable and safe disposal of these wastes by first forming the sludge into a thixotropic consistency and then applying this thixotropic sludge in a film-like manner onto a rotating drum carrier where the film is dried and then formed into metal hydroxide powder or granules which are then collected, concentrated and sintered to form harmless metal oxides which are extremely difficult to dissolve, thereby rendering them safe.

SUMMARY OF THE INVENTION

It is the primary object of the present invention to provide a film applicating device which is designed to carry out the application of the thixotropic sludge onto a rotating drum carrier so that the sludge may be further treated, as set out in U.S. Pat. No. 3,960,725.

To this end, the sludge film applicating device of the present invention is provided with a frame in which is mounted a pair of rotating rollers defining between them a narrow gap into which the sludge of thixotropic consistency is directed. One of these rollers picks up the sludge supplied to the narrow gap and conveys it to a third roller which is rotatably mounted and in surface contact with the circumferential surface of the conveying roller. The third roller is spaced a short distance from the rotating drum carrier and, due to the fact that it is in contact with the conveying roller transporting the sludge to the third roller, the sludge is forced to accumulate to form a "sludge bulge." This sludge bulge is formed in the area limited by the circumferential surface of the rotating drum carrier, the third roller, and the roller of the pair of rollers which contacts the third roller. The sludge bulge at the top portion thereof contacts the circumferential surface of the rotating drum carrier which picks up some of the sludge from the bulge and transports it for subsequent drying, as explained in U.S. Pat. No. 3,960,725.

The thickness of the layer of sludge film formed on the drum carrier is determined by the spacing of the third roller from the circumference of the drum carrier, since sludge of more thickness than this distance will be scraped off by the circumference of the third roller.

The adjustment of the third roller relative to the drum carrier, as well as the total adjustment of the frame mounting all of the elements, is achieved by a pair of supporting arms mounted on a pair of sleeves which are telescopingly mounted about a pair of cantilever supports. A pair of screws connecting the supporting arms with the pair of sleeves determines the angular orientation of the device, while the position of the sleeves themselves on the cantilever supports determines the longitudinal positioning of the frame relative to the carrier.

A yoke connected to the roller of the pair of rollers not contacting the third roller is provided to adjust the position of this roller relative to the roller in contact with the third roller. The yoke has a threaded end terminating in a head portion, which is in contact with an arm of a pivotal shaft. Another arm of the pivotal shaft is in contact with a screw which causes the pitoval shaft to rotate in one or the other directions depending upon whether the screw is extended or contracted.

The third roller which scrapes off the sludge film in excess of the desired thickness is supported on a rest support. The rest support is made of two identical halves, a half on either end of the third roller. Each half is made up of a first portion having a first end pivoted to the frame and a second end which rotatably mounts a pivot pin, and a second portion having a first end rotatably mounting the third roller and a second end also rotatably mounting said pivot pin. The first and second portions are positioned side-by-side in contact with each other in the vicinity of their second ends mounting the pivot pin. The pivot pin is provided at its two ends with a stop which rotates along with the pivot pin, which allows for the positioning of the third roller at a desired position relative to the roller of the pair of rollers in contact with the third roller. A pair of screws is provided on either end of the pivot pin and they extend into the second ends of the first portions of the rest bar halves. The screws when extended abut against the stops on the pivot pin and limit the downward movement of the third roller toward the roller in contact with it. This limiting action, therefore, provides a force adjustment for the contact of the third roller with the roller of the pair of rollers with which it is in contact.

The third roller also has mounted in vicinity of its two ends a pair of scrapers which prevent the formation of sludge bulge beyond the ends of the third roller. These scrapers are mounted on the rest bar. Also mounted on the support are a pair of slide blocks which contact the surface of the rotating drum carrier to position the frame relative to the carrier. The slide blocks are mounted on the rest support near and above the ends of the third roller.

BRIEF DESCRIPTION OF THE DRAWING

The invention will be more readily understood with reference to the accompanying drawing, wherein.

DETAILED DESCRIPTION OF THE INVENTION

Figure 1:
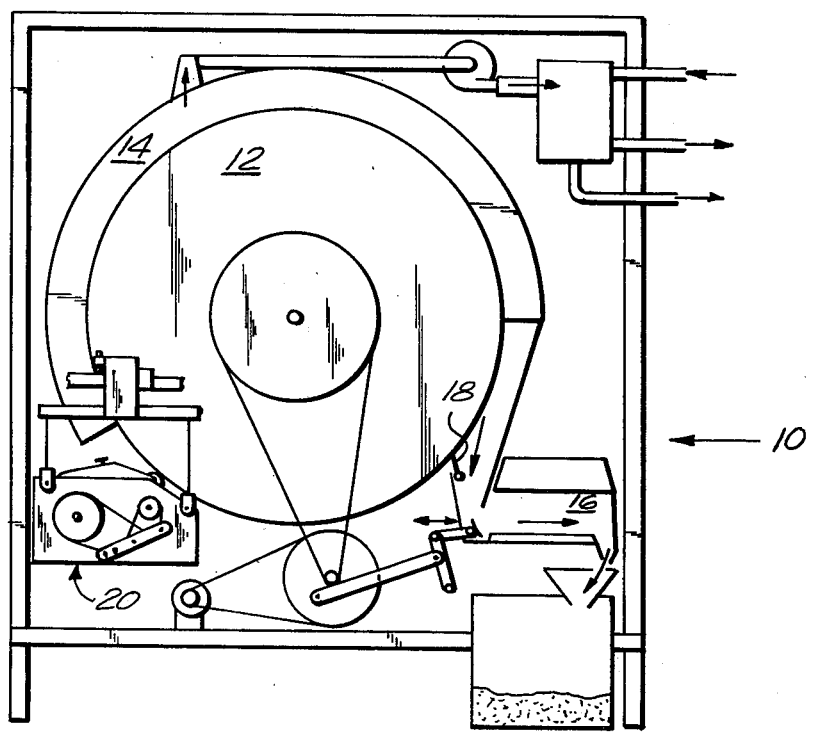
FIG. 1 is a schematic view showing the sludge film applicating device of the present invention in its environment in a sludge treatment apparatus.

Referring now to the drawing, there is shown in FIG. 1 an apparatus for treating a thixotropic sludge. The apparatus 10 has been adequately explained in U.S. Pat. No. 3,960,725, and includes a rotating drum carrier 12 which receives thixotropic sludge in a film-like manner from the film applicating device 20 of the present invention. The rotating drum carrier 12 rotates the sludge film past a heater 14 where the sludge is heated and then conveyed to a sintering device 16 where the granules of metal hydroxide scraped off the rotating drum carrier by scraper 18 are compacted into a powder of metal oxide or into concentrated granules of metal oxide.

Figure 2:
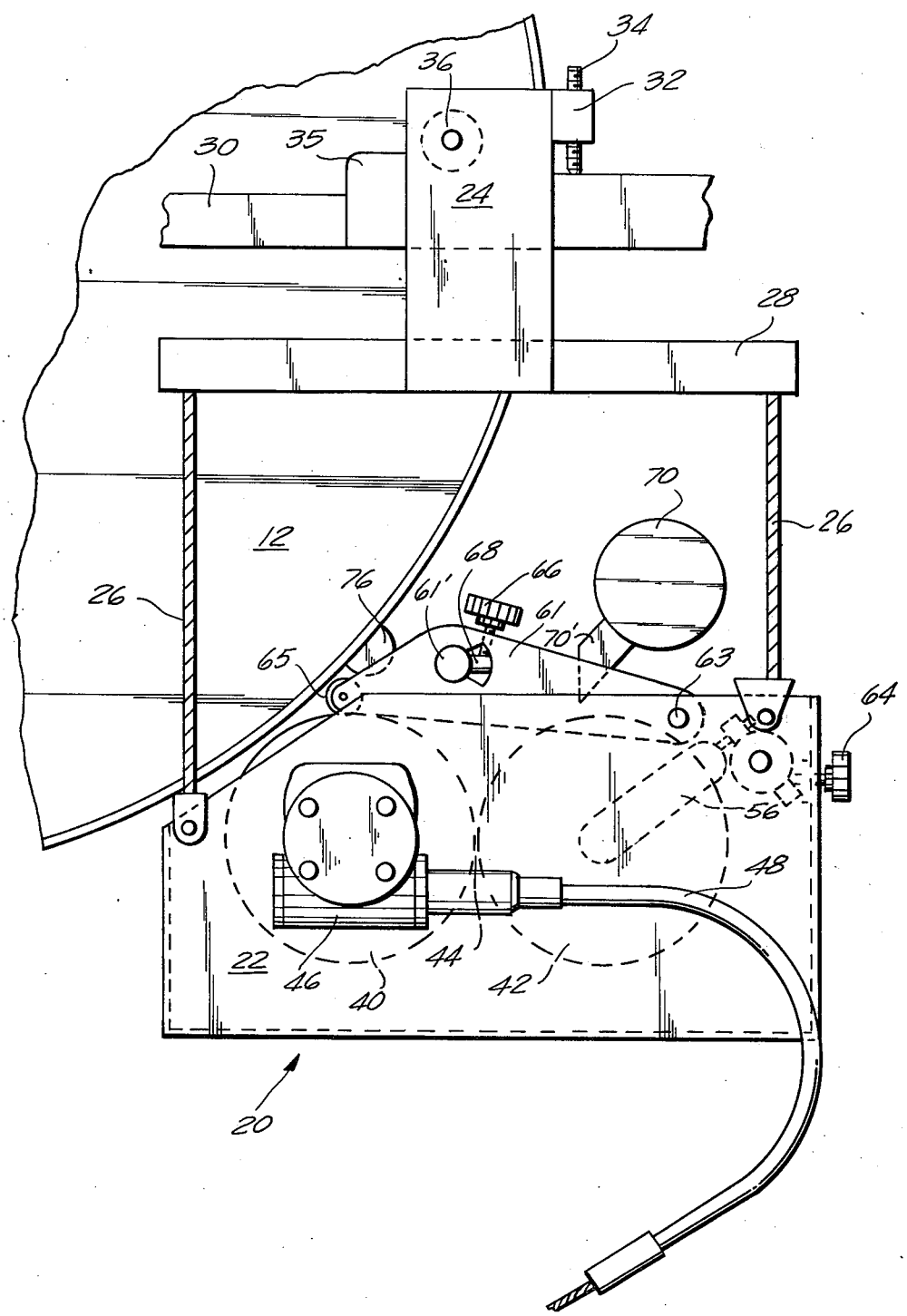
FIG. 2 is a front view of the sludge film applicating device of the invention.
Figure 3:
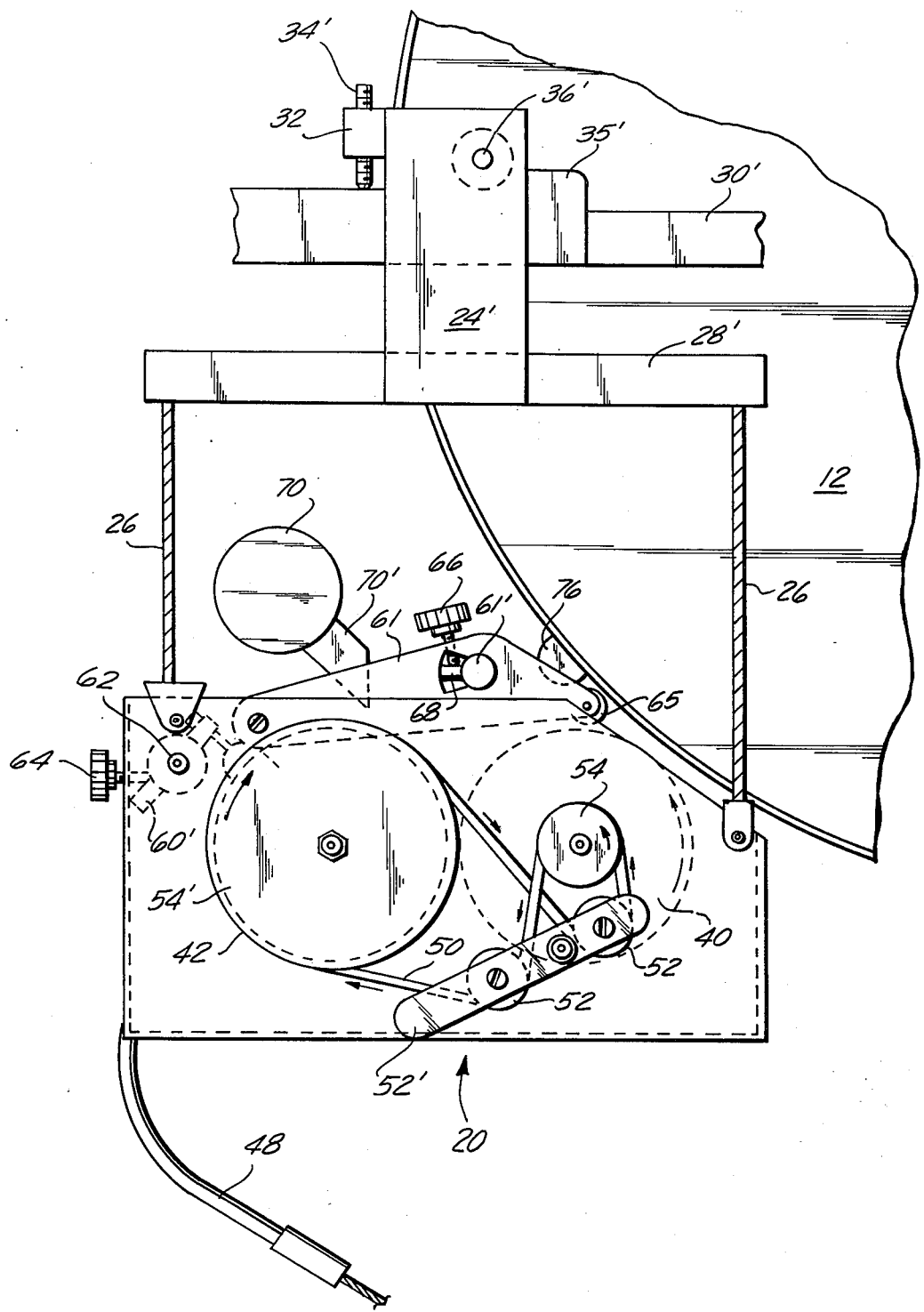
FIG. 3 is a rear view of the sludge film applicating device of the invention.
Figure 4:
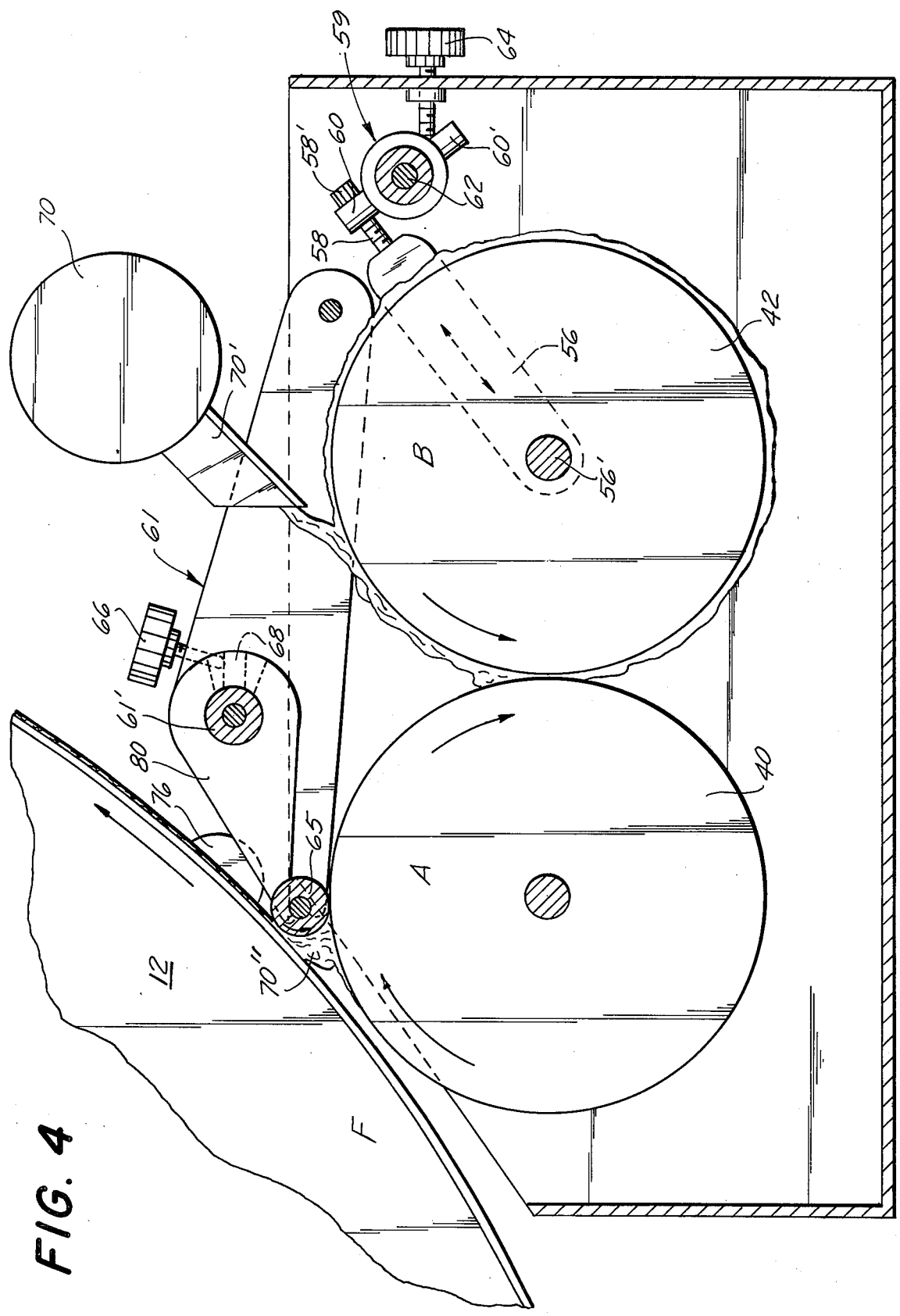
FIG. 4 is a view similar to FIG. 2 and showing in greater detail the sludge bulge formed due to the method of the present invention.

The film applicating device 20 of the present invention is best seen in FIGS. 2-4, and can be seen as having a box-like supporting frame 22 which is suspended from pivotally mounted suspension bars 24, 24' via cables 26 and support brackets 28, 28' mounted to the bottom portions of the suspension bars. The suspension bars 24, 24' are adjustably mounted on cantilever supports 30, 30' by means of threaded eyelets 32, 32' and screws 34, 34' and sleeve 35, 35' so that the angular orientation of the suspension bars may be varied relative to its point of pivotal mounting 36, 36' and its location on the supports 30, 30'. By lengthening the extension of the screws 34, 34' the suspension bars and the frame 22 are pivoted away from the circumferential surface of the rotating drum carrier 12, while shortening the extension of the screws 34, 34' will pivot the frame 22 toward the drum carrier. This positioning of the frame allows for changing of the film thickness which is applied onto the rotating drum carrier, as will be explained below.

Mounted within the frame 22 are a pair of rotatably mounted rollers 40, 42 which define therebetween a narrow gap 44. The roller 40 is driven by means of a worm gear 46, a flexible shaft 48, and a motor (not shown). The roller 42 is driven off of the roller 40 by transmission means shown in FIG. 3. The transmission means include a cross-laid transmission belt 50 which is trained around a pair of rollers 52 rotatably mounted on a frame 52', in the manner shown in FIG. 3. A pulley 54 associated with the roller 40 is of much smaller diameter than the pulley 54' so that the roller 40 rotates at approximately three times the speed of the roller 42. The transmission means also act as a sliding clutch for the roller 42.

The width of gap 44 may be adjusted by slightly altering the position of the roller 42 relative to the roller 40. This is accomplished by means of a yoke 56 secured to a shaft 56' rotatably supporting the roller 42. The yoke 56 threadingly receives therein a screw 58 which also has a head portion 58' abutting against an arm 60 of an actuating member 59. The actuating member 59 also has a second arm 60' and is rotatably mounted about a shaft 62. A screw 64 controls the position of the actuating means 59 by contacting the arm 60'. Thus, upon the extension of a screw 64, the actuating member 59 is rotated clockwise and forces the head 58' upwardly, thereby widening the gap between rollers 40 and 42. By shortening the extension of the screw 64, the gap is similarly narrowed.

Pivotally mounted above the rollers 40 and 42 is a rest support 61 formed of two identical halves which is pivotally mounted at one end to a pivot shaft 63 and, at its other end, rotatably mounts a roller 65 in contact with the circumferential surface of the roller 40. The roller 65 is limited in its pivotal movement about shaft 61' toward the roller 40 by means of adjustable screws 66 abuting against stops 68 formed at the ends of the pivot shaft 61' connecting the two halves of the rest bar 61. The roller 65 is spaced from the circumferential surface of the rotating drum carrier 12 a distance that determines the thickness of the layer of sludge film applied to the carrier. The closer the roller 65 is to the surface of the carrier, the thinner is the sludge film applied thereto. Again, this distance between the carrier 12 and the roller 65 is controlled by the angle of pivot of the suspension bars 24, 24' as described above.

A feed tube 70 having an outlet 70' is mounted above the roller 42 and supplies thixotropic sludge to the rotating surface of the roller 42. As can be seen in FIG. 3, the roller 42 rotates clockwise and transports the thixotropic sludge thereon downwardly to the narrow gap formed between the roller 42 and the roller 40. The roller 40, which rotates oppositely to the roller 42, picks up the thixotropic sludge on its outer circumferential surface and carries it around to the roller 65. The roller 65 causes an accumulation of sludge to form, as can be seen in FIG. 4 by reference character 70". This accumulation of sludge continues to build up until the point where it reaches the circumferential surface of the rotating drum carrier 12, whereupon it is transported thereby and subsequently heated as described above. When the accumulated thixotropic sludge reaches this height, it is continuously replenished by new sludge being transported thereto by the roller 40. The distance between the roller 65 and the circumferential surface of the rotating drum carrier determines the thickness of the film layer since the roller 65 will scrape off any amount in excess of this thickness.

A pair of sliding blocks 76 are supported on the rest bar and serve to fix the applicating device relative to the rotating drum carrier, as shown in FIGS. 1-3.

A pair of scrapers 80 (only one being shown in FIG. 4) prevents accumulation of the sludge beyond the ends of the roller 65. The scrapers 80 are mounted at the two ends of the roller 65.

The device, when not in use, may be slid along the supports 30 away from the drum carrier 12, and when the device is to be used it is slid toward the drum carrier, to the left in FIG. 2. After the device has been longitudinally positioned on the supports 30, the angular setting is carried out via the screws 34 so that the roller 65 is spaced from the circumferential surface of the carrier the desired distance to achieve the desired layer thickness of the sludge on the carrier. The blocks 76 position the frame 20 relative to the carrier surface such that, regardless of temperature changes in the surroundings, the frame and therefore the roller 65 are always positioned from the surface of the carrier 12 the same distance. After this initial setting up, the sludge of thixotropic consistency is delivered to the roller 42 via the inlet 70', whereupon the sludge is laid on the surface of the roller 40 by means of the narrow gap 44. The thus-adhered sludge will then be delivered to the roller 65 where most of it is prevented from traveling any further, so that a "sludge bulge," or an accumulation of sludge, takes place between the roller 65, the roller 40, and the surface of the drum carrier 12. The drum carrier 12 will then transport the sludge with a film thickness defined by the spacing of the roller 65 from the surface of the drum carrier 12. Any excess sludge delivered to the sludge bulge will be carried back to the narrow gap 44 by the rotating roller 40. The amount of sludge returned to the narrow gap is controlled by the screw 66 which determines the force of the roller 65 on the roller 40. It is noted that the roller 65 pivots about the shaft 61' by means of that portion of the rest support between the shaft 61' and the roller 65. Thus, the shaft 61' allows pivotal rotation between that portion of the rest support between the pivot shaft 63 and the shaft 61' and that portion of the rest supported between the shaft 61' and the roller 65.

While a specific embodiment of the invention has been shown and described, it is to be understood that numerous changes and modifications may be made without departing from the scope and spirit of the invention.

What is claimed is:

1. A sludge film applicating device for applying a film onto a carrier, comprising: a frame; means supporting said frame for longitudinal and pivotal adjustment relative to the carrier; a first roller rotatably mounted in said frame; a second roller also rotatably mounted in said frame near said first roller, said first and second rollers being so mounted as to define therebetween a narrow gap into which the sludge to be treated is directed; a third roller rotatably mounted above said first roller and in contact therewith so that said first and third rollers rotate oppositely to each other; means for mounting said third roller above said first roller, said mounting means having force-adjusting means thereon for adjusting the force which said third roller exerts on said first roller; and means above said second roller for supplying sludge to said second roller whereupon said second roller transports said sludge to said narrow gap where it is picked up by said first roller and conveyed to said third roller where the sludge is accumulated to contact the carrier.

2. The applicating device according to claim 1, wherein said means mounting the frame comprises a pair of supporting bars; a pair of sleeves telescopingly mounted on cantilever supports for sliding movement therealong, said pair of supporting bars being pivotally mounted to said pair of sleeves at the top surface thereof, each of said supporting bars having a threaded eyelet and a screw extending through said eyelet, said screw contacting a respective one of said sleeves whereby the angle of said supporting bars relative to said sleeves may be varied thereby to vary the angular orientation of said frame; a pair of brackets connected to the bottom surfaces of said pair of supporting bars; and a plurality of cables connecting said pair of brackets with said frame thereto to suspend said frame from said brackets.

3. The applicating device according to claim 1, wherein said rest support comprises a first half and a second half, each of said halves comprising a first portion having one end pivoted to said frame and a second end; a second portion having a first end rotatably mounting said third roller, and a second end; and a pivot shaft pivotally connecting said second ends of said first and second portions so that said third roller may be forced adjusted, said first and second ends supporting therebetween said third roller and said pivot shaft.

4. The applicating device according to claim 3, wherein said means for adjusting the force of said third roller on said first roller comprises a pair of screws on said first portions of said first and second halves, and a pair of stops formed on the ends of said pivot shaft which contacts said screws for limiting the downward movement of said third roller.

5. The applicating device according to claim 1, further comprising means for adjusting the distance of said second roller from said first roller.

6. The applicating device according to claim 5, wherein said means for adjusting the distance of said second roller from the first roller comprises a yoke having a first end connected to the shaft rotatably mounting said second roller, and a second end having a first screw thereon and a head at the termination of said first screw thereon and a head at the termination of said first screw; a pivotally mounted shaft having first and second arms diametrically opposed to each other, said first arm having a threaded hole formed therein for receiving said first screw of said yoke; and a second screw rotatably mounted in said frame abutting against said second arm, whereby upon the extension of said second screw said yoke is lifted thereby to move said second roller away from said first roller.

7. The applicating device according to claim 6, wherein said rest support further comprises a pair of end scrapers mounted near the ends of said third roller for preventing accumulation of sludge past the ends of said third roller, each scraper comprising a plate having a pointed end extending to said third roller.

8. The applicating device according to claim 7, wherein said rest bar further comprises a pair of slide blocks mounted above said pointed ends of said end scrapers, each slide block having a surface conforming to the circumferential surface of said rotating drum carrier, said slide blocks positioning said frame and said rollers from said carrier.

* * * * *